F. CLEMENS.
Wagon-Brakes.
No. 157,376.  Patented Dec. 1, 1874.
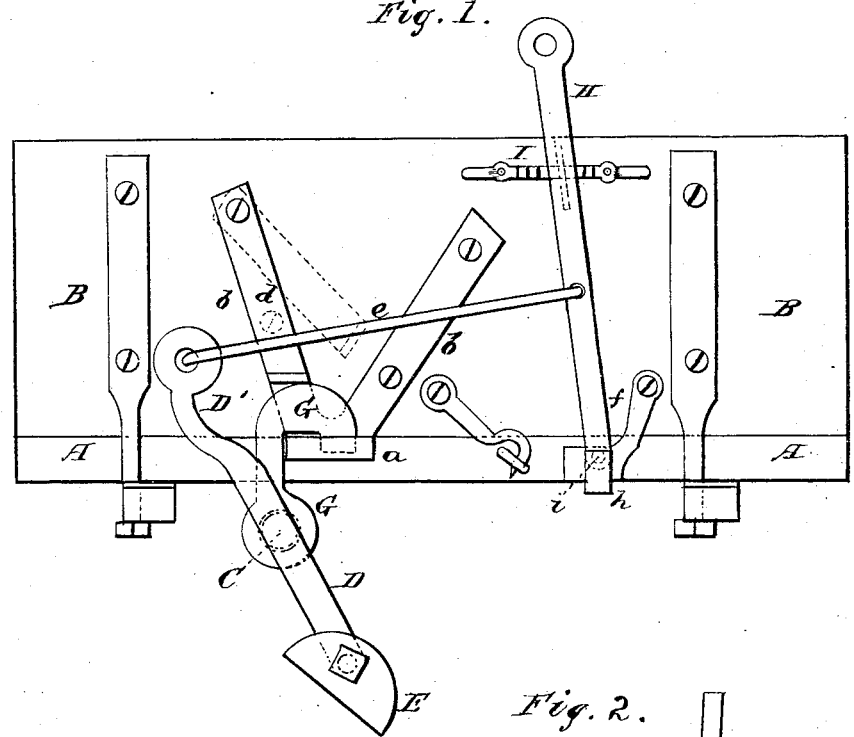
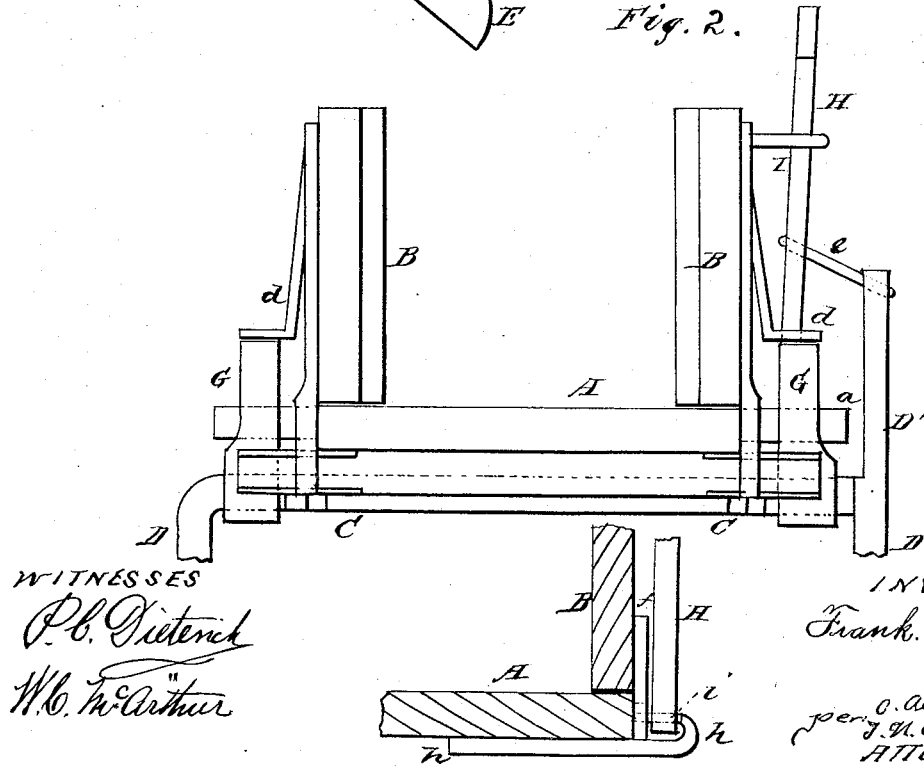
WITNESSES
P. C. Dieterich
W. C. McArthur
INVENTOR
Frank Clemens
per C. Alexander
J. N. Alexander
ATTORNEY

UNITED STATES PATENT OFFICE.

FRANK CLEMENS, OF LA FAYETTE, INDIANA.

IMPROVEMENT IN WAGON-BRAKES.

Specification forming part of Letters Patent No. 157,376, dated December 1, 1874; application filed October 20, 1874.

*To all whom it may concern:*

Be it known that I, FRANK CLEMENS, of La Fayette, in the county of Tippecanoe and State of Indiana, have invented certain new and useful Improvements in Wagon-Brakes; and I do hereby declare that the following is a full, clear, and exact description thereof, reference being had to the accompanying drawings, and to the letters of reference marked thereon, which form part of this specification.

The nature of my invention consists in the construction and arrangement of a wagon brake or lock, as will be hereinafter more fully set forth.

In order to enable others skilled in the art to which my invention appertains to make and use the same, I will now proceed to describe its construction and operation, referring to the annexed drawing, in which—

Figure 1 is a side elevation; Fig. 2, end view. Fig. 3 is a detail view, showing bar $h$.

A represents the bottom, and B B the sides, of a wagon-bed, which are made detachable from each other, and united together by means of certain devices, which may hereafter be described in a separate application. C represents the brake-shaft, provided or formed with an arm, D, on each end, and upon said arms the brake-shoes E are secured. The brake-shaft C runs under the wagon-bed, and has its bearings in two hooks, G G, which are suspended in ears $a\ a$, one upon each side of the wagon-bed. Each ear $a$ is formed at the lower ends of two straps, $b\ b$, which are securely fastened to the side of the wagon-bed. To one of these straps is pivoted a latch, $d$, which is brought down on top of the hook G to hold the same in the ear $a$. By raising the latches $d\ d$ the hooks G can easily be lifted out of the ears $a$ when it is desired to detach the sides of the bed. At one end of the brake-shaft C is another arm, D', which is connected, by a rod, $e$, with a lever, H, working in a ratchet, I, to hold the brake locked. The lower end of the lever H is pivoted in the following manner: On the under side of the bed-bottom A is fastened a bar, $h$, which extends beyond the side of the bed, and its outer end bent upward and inward, forming upon its end a round tenon, $i$. The lower end of the lever H has a hole to be placed over this tenon, and upon the side B is fastened a bar, $f$, which extends downward and in between the tenon $i$ and the edge of the bottom A, thus holding the lever on the tenon.

Having thus fully described my invention, what I claim as new, and desire to secure by Letters Patent, is—

1. The combination, with a wagon-bed, A B, of the brake-shaft C, hooks G G, and the straps $b\ b$, with ears $a$, all substantially as and for the purposes set forth.

2. The latches $d$, in combination with the straps $b$, with ears $a$, and the brake-shaft supporting hooks G, as and for the purposes set forth.

3. The combination, with the wagon-bed A B, of the bent bar $h$, with tenon $i$, the lever H, and bar $f$, all substantially as and for the purposes set forth.

In testimony that I claim the foregoing as my own invention I affix my signature in presence of two witnesses.

FRANK CLEMENS.

Witnesses:
JAS. R. CARNAHAN,
JOHN VANDERSCHOFF.